United States Patent
Bailleul et al.

[11] Patent Number: 5,973,502
[45] Date of Patent: Oct. 26, 1999

[54] CAPACITIVE SENSOR INCLUDING A COAXIAL CABLE AND A PROBE

[75] Inventors: Gilles Bailleul, Conde-Sur-Noireau; Samim Albijat, Flers, both of France

[73] Assignee: Thermacoax SAS, France

[21] Appl. No.: 08/882,440

[22] Filed: Jun. 25, 1997

[30] Foreign Application Priority Data

Jun. 26, 1996 [FR] France .................................. 96 07942

[51] Int. Cl.⁶ .................................................. G01R 27/26
[52] U.S. Cl. ........................ 324/690; 324/662; 324/671
[58] Field of Search ................................... 324/661, 662, 324/663, 671, 686, 688, 690, 687

[56] References Cited

U.S. PATENT DOCUMENTS

| | | | |
|---|---|---|---|
| 4,063,167 | 12/1977 | Duty | 324/671 |
| 4,329,644 | 5/1982 | Libertini et al. | 324/662 |
| 4,804,905 | 2/1989 | Ding et al. | 324/662 |
| 4,818,948 | 4/1989 | Dooley | 324/662 |
| 5,101,165 | 3/1992 | Rickards | 324/662 |
| 5,166,626 | 11/1992 | Hester et al. | 324/690 |
| 5,497,101 | 3/1996 | Fillion | 324/662 |

FOREIGN PATENT DOCUMENTS

| | | |
|---|---|---|
| 0246576A1 | 11/1987 | European Pat. Off. . |
| 2071852 | 9/1981 | United Kingdom . |

*Primary Examiner*—Diep Do
*Attorney, Agent, or Firm*—Armstrong Teasdale LLP

[57] ABSTRACT

A composite capacitive sensor device for use at least up to 1300° C. and 40 bar, including a coaxial cable comprising a conductive sleeve (10) and an inner conductor (21), which are separated by a first insulator (19), and a probe (1) comprising elements which are all refractory and anticorrosive, which are respectively connected to the end portions of said cable and which comprise a metal housing (2) and an electrode (4) having a flat surface (4a) of larger area than the cross-sectional area of the inner conductor, which elements are separated by a second insulator (9) associated with locking means (3, 16) and are secured by means which are all refractory and anticorrosive (11a–11e).

18 Claims, 2 Drawing Sheets

CAPACITIVE SENSOR INCLUDING A COAXIAL CABLE AND A PROBE

BACKGROUND OF THE INVENTION

1. Field of the Invention

The invention relates to a composite capacitive sensor device including a probe having an electrode with a flat surface and including a coaxial cable for connecting said probe to measurement means.

The invention is applied particularly in the aircraft industry for the dynamic measurement of the speed of rotation of rotor blades in the casing of a turbo engine and for the measurement of the clearance existing between the rotor blade tips and this casing.

2. Description of the Prior Art

A capacitive sensor for a turbo engine is already known from the Patent EP 0246576. This sensor comprises a metal probe body having two different inner diameters. The part having the larger inner width is disposed at the end of the probe and accommodates a flat disc-shaped electrode having a first surface which should be disposed opposite the rotor blade tips of the turbo engine and having its other surface connected to the central conductor of a coaxial cable. This coaxial cable is surrounded by a metal sleeve fixed to the small-diameter part of the probe body. In the large-diameter part the electrode is insulated from the probe body by a mineral insulator. The coaxial cable further comprises a guard electrode extended by a guard ring disposed around the electrode in the large-diameter part.

The materials and welding means of the various parts of the known sensor probe allow the probe to be used at a maximum temperature of 750° C. To this end, the metal parts of the coaxial cable are made of Inconel and are insulated from one another by a mineral insulator, the electrode is made of platinum and is insulated from the probe body by an aluminum oxide, and the elements formed by the probe body and the sleeve on the one hand and by the electrode and the central conductor on the other hand are joined to one another by means of a solder material. Such joints also connect the guard electrode to the coaxial cable and the guard ring to the probe body.

It is an object of the present invention to provide such a capacitive sensor device suitable for use in a turbo machine referred to as a combustion chamber, which also comprises rotor blades, i.e. a rotor, in a stationary part, or stator, where the temperature at which the known sensor is used is of the order of 1300° C. and the pressure is of the order of 40 bar.

It is another object of the present invention to provide a device whose electrode surface has a diameter which is as large as possible without the other specifications being affected, since the signal obtained for the capacitance measurement is proportional to the area of the conductive surface.

SUMMARY OF THE INVENTION

These problems are solved by means of a composite capacitive sensor device for use at least up to 1300° C. and 40 bar, including a coaxial cable comprising a conductive sleeve and an inner conductor, which are separated by a first insulator, and a probe comprising elements which are all refractory and anticorrosive, which are respectively connected to the end portions of said cable and which comprise a metal housing and an electrode having a flat surface of larger area than the cross-sectional area of the inner conductor, which elements are separated by a second insulator associated with locking means and are secured by means which are all refractory and anticorrosive.

In accordance with this novel concept this device has a high mechanical strength, particularly at the required pressure of 40 bar and at temperatures of at least 1300° C.

In general, this sensor, referred to hereinafter as a composite sensor, can supply a signal having a large value for measuring a capacitance value with a high accuracy, it is highly resistant to thermal shocks, it is corrosion proof, insensitive to vibrations, and it can very easily be mounted on, for example, a combustion chamber casing.

BRIEF DESCRIPTION OF THE DRAWINGS

The diagrammatic Figures, which show a device in accordance with the invention, are described briefly hereinafter.

DETAILED DESCRIPTION OF THE INVENTION

Hereinafter, embodiments of a capacitive sensor device will be described in more detail by way of non-limitative examples.

The device described hereinafter is a capacitive sensor capable of operating at temperatures as high as 1300° C. and pressures of the order of 40 bar with improved detection of a signal which is a function of a measured capacitance.

Figure 1:
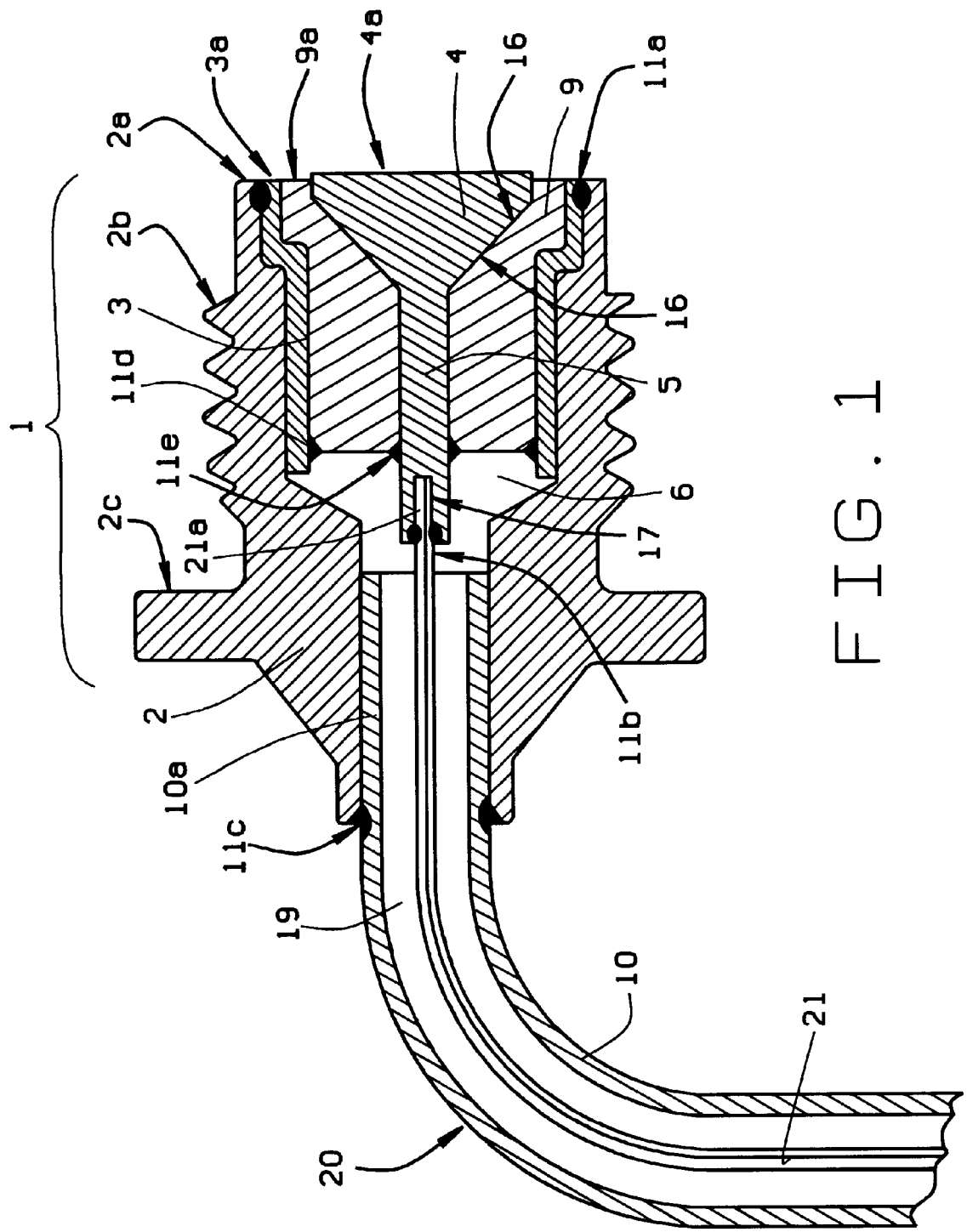
FIG. 1 is a longitudinal sectional view showing an example of an embodiment of a capacitive sensor.

FIG. 1 is a longitudinal sectional view of a capacitive sensor, which sensor comprises a probe 1 and a coaxial cable 20.

The coaxial cable 20 comprises a metal sleeve 10 and a central conductor 21, which is separated from the sleeve by a compacted mineral powder insulator 19 and which is bare at its end 21a facing the probe.

The probe 1 includes:

a cone-shaped refractory and anticorrosive metal electrode 4 having a flat circular base forming a flat surface 4a whose area is larger than the cross-sectional area of the conductor of the cable, which electrode constitutes one electrode of a capacitor; the top of the cone has been provided with a stem 5 with a recess 17 situated in a part remote from the flat surface 4a, for receiving the bare part 21a of the central conductor 21, in such a manner that this end 21a of said central conductor is in free electrical contact with this metal electrode 4, to which it is connected by a weld 11b;

a refractory and anticorrosive insulating ring 9 having an axial conical recess for engagement with the conical electrode 4 and a hole for the passage of the stem 5 to which it is connected by a weld 11e;

a probe housing 2 which is of a refractory and anticorrosive metal and which comprises a part of larger inner diameter for receiving the electrode 4 fitted in the ring 9, and a part of smaller inner diameter for receiving the coaxial cable with the sleeve 10 fixed by means of a weld 11c;

a locking ring 3 of a refractory and anticorrosive metal secured to the front surface of the metal housing 2 by means of a weld 11a, in the housing part of larger inner diameter, and secured to the insulating ring 9 by means of a weld 11d, locked in this ring by means of a shoulder.

The various parts of the sensor are thus secured to one another so as to assure a very high mechanical rigidity and a very good imperviousness to any gas or corrosive substance which can be emitted in the environment of the sensor during its use. The welding means between metal parts are laser welds, are refractory and anticorrosive, and are referenced:

11a between the probe housing 2 and the metal ring 3, 11b between the end part 21a of the central conductor of the coaxial cable and the recess 16 of the electrode 4, 11c between the probe housing 2 and the sleeve 10 of the coaxial cable The welding means between metal parts and insulating parts are of the type using palladium, are refractory and anticorrosive, and are referenced:

11d between the insulating ring 9 and the stem 5 of the electrode 4, 11e between the insulating ring 9 and the locking ring 3.

The flat electrode surface 4a is adjusted relative to a reference surface 2c of the probe housing in such a manner that it is disposed exactly in a reference plane. When used for measuring characteristics of a combustion chamber of a turbo engine, this flat electrode surface 4a can thus be aligned with the inner surface of the casing. The other elements 2, 3 and 9 of the sensor are aligned at 2a, 3a and 9a, respectively, receding slightly with respect to the flat electrode surface 4a.

This sensor has several important features:

a) the electrode 4 is seated in the insulating body 9 in the conical recess 16 and is locked by the weld 11e, which provides a very good mechanical strength while enabling a substantial area to be obtained for the flat surface 4a;

b) the end 21a of the conductor of the coaxial cable is secured in the electrode 4 in a cylindrical recess 17 by means of a laser weld 11b, which ensures a very good electrical contact and a very high mechanical strength;

c) the part 10a of the metal sleeve of the coaxial cable 20 is secured in the small-diameter part of the probe housing 2 by the laser weld 11c;

d) the insulating ring 9 is locked in the body of the probe housing 2 by means of the metal ring 3 which has a locking shoulder and is secured by the weld 11d;

e) the metal ring is secured to the probe housing 2 by means of the laser weld 11a;

f) the materials are chosen in such a manner that they can each handle very high temperatures of 1300° C.;

g) the materials are chosen in such a manner that in relation to one another their expansion coefficients provide and maintain a coherence of the various parts of the sensor and a constant mechanical strength between ambient temperatures of 20° C. and 1300° C.

To this end, the probe housing 2, the electrode 4 and the metal locking ring 3 are made of refractory and anticorrosive metals, for example of platinum, or for example of MA956, which is a refractory and anticorrosive conductive alloy available from HAYNES (1020 West Park Avenue, PO Box 9013, Kokom, Ind. 46904, USA), the insulating ring 9 being made of, for example, aluminum or beryllium oxide.

In order to form the palladium welds 11d, 11e between the ceramic insulating ring 9 and the metal locking ring 3 and the metal electrode 4, respectively, said insulating ring 9 is previously provided with a metallization formed by a mixture of tungsten. yttrium and oxides of these metals in the welding areas.

In the coaxial cable 10 the conductor and the sleeve are made of Inconel and the insulator is of magnesium oxide.

The advantage of the sensor having this structure and designed with these materials is that it is possible to use a standard series-produced and, consequently, cheap coaxial cable and to form the probe by adding thereto a small number of parts in a composite manner, which parts can also be series produced. Using all these elements formed by mechanical standard means, the sensor probe is subsequently mounted carefully with the aid of parts, which may have been pre-treated to allow this careful mounting.

The probe is mechanically strong owing to the metal ring 3 and the conical fit of the electrode 4 in the insulating body 9. Owing to the cylindrical fit of the end of the central conductor 21a of the cable in the recess 17 of the electrode 4, the electrical contact is excellent. As a result of the choice of the metal materials, the insulating materials and of the welds and brazed joints, which are all refractory and anticorrosive, the mechanical and electrical characteristics are maintained up to very high temperatures of 1300° C. at a high pressure of 40 bar. The number of welds and brazed joints is minimized.

Figure 2A:
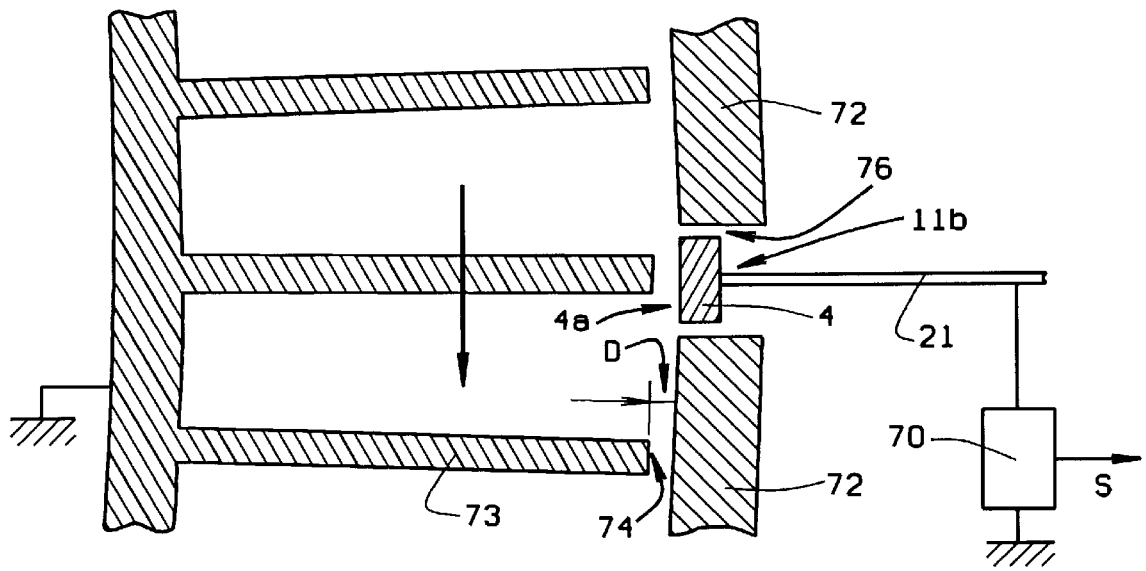
FIG. 2A shows diagrammatically a capacitive sensor mounted on the casing of a turbo engine.

When used for measuring characteristics of a combustion chamber of a turbo engine, for which reference is made to FIG. 2A, the probe 1 is mounted in the opening 76 of the casing 72 by screwing the screwthread 2b onto a boss provided on the casing 72 until the reference surface 2c abuts with the casing. The sides of the probe housing have been pre-treated very accurately to assure that after fitting the surface 4a engages against the inner surface of the casing with a very high precision.

Figure 2B:
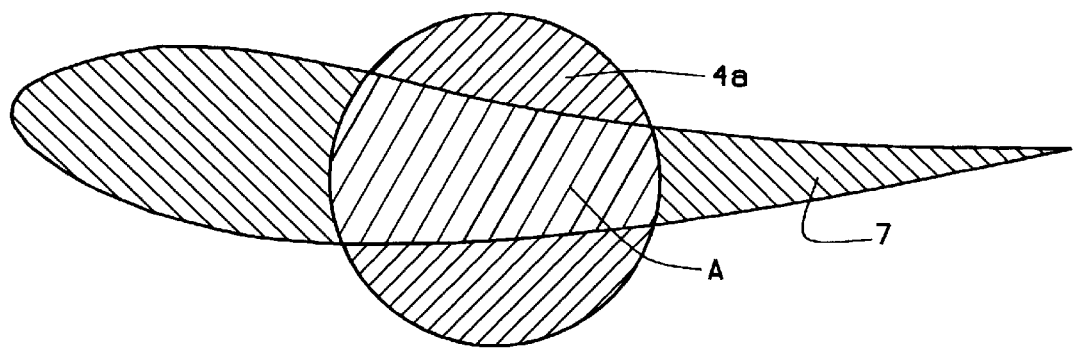
FIG. 2B shows a projection of the electrode surface involved in determining the variable capacitance.

The conductive surface 4a forms a capacitor with respect to the tip of a rotor blade as this tip 74 passes close to said surface, the capacitance of this capacitor being an inverse function of the clearance D. Moreover, referring now to FIG. 2B, which shows a projection of the blade 73 on the conductive surface 4a, the variable capacitance is proportional to area A of overlap of the conductive surface 4a of the electrode with the projected surface 7 of the blade 73.

By connecting the other end of the conductor 21 of the coaxial cable 20 to a circuit 70 similar to one of the circuits known from the Patent Specification GB 2 071 852, or any other equivalent oscillator circuit, this circuit can produce an output signal S which is a function of the capacitance of the capacitor formed by the tip of the blade 74 and the conductive surface 4a. This signal S can be processed electronically in known manner in order to determine the clearance D or the speed of rotation of the turbine rotor.

Thus, by means of the device in accordance with the invention the following parameters can be determined simultaneously for the same point of the casing:

blade tip clearance, rotor speed, which are decisive for correctly controlling the engine.

By means of this sensor of a composite construction thus formed by combining a standard coaxial cable and a probe formed by specially machined elements adapted to this cable, it is possible to obtain a strong signal S in that an electrode is formed whose conductive surface has a large area, to which this signal is proportional, while complying with very severe temperature and pressure criteria. Until now, it has not been possible with the known state of the art, to realize capacitive sensors capable of operating at such high temperatures.

What is claimed is:

1. A capacitive sensor device comprising:

a coaxial cable comprising a conductive sleeve, an inner conductor extending through said sleeve, and an insulator between said inner conductor and said conductive sleeve; and a probe comprising a probe housing, an electrode at least partially located within said housing, said electrode comprising a conical shaped portion and a stem portion, said coaxial cable inner conductor secured to said electrode stem portion, said probe further comprising a locking ring secured to an inner surface of said housing and an insulator ring between said electrode and said locking ring, said insulator ring comprising a conical recess for receiving said electrode, said insulator ring secured to said locking ring and to said electrode.

2. A capacitive sensor device in accordance with claim 1 wherein a portion of said conductive sleeve extends within said housing, said sleeve secured to said housing by a weld.

3. A capacitive sensor device in accordance with claim 1 wherein said stem portion comprises a recess, a portion of said coaxial cable inner conductor extending into said recess, said inner conductor secured to said electrode by a weld.

4. A capacitive sensor device in accordance with claim 1 wherein said conical shaped portion of said electrode comprises a flat surface, said flat surface having an area greater than a cross-sectional area of said coaxial cable inner conductor.

5. A capacitive sensor device in accordance with claim 4 wherein said housing comprises a reference surface for facilitating alignment of said flat surface in a reference plane.

6. A capacitive sensor device in accordance with claim 1 wherein said coaxial cable insulator comprises magnesium oxide powder, and said conductor and said sleeve comprise Inconel.

7. A capacitive sensor device in accordance with claim 1 wherein said probe housing, said electrode, and said locking ring comprise at least one of platinum and MA956, and said insulating ring comprises at least one of aluminum oxide and beryllium oxide.

8. A capacitive sensor device for generating a signal representative of at least one of blade tip clearance and rotor speed in a turbine engine, said sensor device comprising:

a coaxial cable comprising a conductive sleeve, an inner conductor extending through said sleeve, and an insulator between said inner conductor and said conductive sleeve;

a probe comprising a probe housing, an electrode at least partially located within said housing, said coaxial cable inner conductor connected in electric circuit with said electrode, said probe further comprising a locking ring secured to an inner surface of said housing and an insulator ring between said electrode and said locking ring;

said housing, said electrode, said locking ring, and said insulator ring comprising metals which are refractory and anticorrosive; and said cable and said probe arranged so that said sensor device can be used in environments having ambient temperatures between about 20° C. and 1300° C.

9. A capacitive sensor device in accordance with claim 8 wherein said electrode comprises a conical shaped portion and a stem portion, said coaxial cable inner conductor secured to said electrode stem portion.

10. A capacitive sensor device in accordance with claim 9 wherein said insulator ring comprises a conical recess for receiving said electrode, said insulator ring secured to said locking ring and to said electrode.

11. A capacitive sensor device in accordance with claim 9 wherein said stem portion comprises a recess, a portion of said coaxial cable inner conductor extending into said recess, said inner conductor secured to said electrode by a weld.

12. A capacitive sensor device in accordance with claim 9 wherein said conical shaped portion of said electrode comprises a flat surface, said flat surface having an area greater than a cross-sectional area of said coaxial cable inner conductor.

13. A capacitive sensor device in accordance with claim 12 wherein said housing comprises a reference surface for facilitating alignment of said flat surface in a reference plane.

14. A capacitive sensor device in accordance with claim 8 wherein said coaxial cable insulator comprises magnesium oxide powder, and said conductor and said sleeve comprises Inconel.

15. A capacitive sensor device in accordance with claim 8 wherein said probe housing, said electrode, and said locking ring comprise at least one of platinum and MA956, and said insulating ring comprises at least one of aluminum oxide and beryllium oxide.

16. A capacitive sensor device in accordance with claim 8 wherein a portion of said conductive sleeve extends within said housing, said sleeve secured to said housing by a weld.

17. A capacitive sensor device comprising:

a coaxial cable comprising a conductive sleeve, an inner conductor extending through said sleeve, and an insulator between said inner conductor and said conductive sleeve; and a probe comprising a probe housing, an electrode at least partially located within said housing, said electrode comprising a conical shaped portion and a stem portion, said conical shaped portion of said electrode comprising a flat surface, said flat surface having an area greater than a cross-sectional area of said coaxial cable inner conductor, said stem portion comprising a recess, a portion of said coaxial cable inner conductor extending into said recess, said inner conductor secured to said electrode by a weld, said probe further comprising a locking ring secured to an inner surface of said housing and an insulator ring between said electrode and said locking ring, said insulator ring comprising a conical recess for receiving said electrode and secured to said locking ring and to said electrode, a portion of said coaxial cable conductive sleeve extending within said housing and secured to said housing by a weld.

18. A capacitive sensor device in accordance with claim 17 wherein:

said coaxial cable insulator comprises magnesium oxide powder;

said coaxial cable inner conductor and said sleeve comprise Inconel;

said probe housing, said electrode, and said locking ring comprise at least one of platinum and MA956; and said insulating ring comprises at least one of aluminum oxide and beryllium oxide.

* * * * *